Sept. 26, 1939.  F. A. FOUSER  2,174,384
APPARATUS FOR FILLING CONTAINERS
Filed Oct. 2, 1936  2 Sheets-Sheet 2
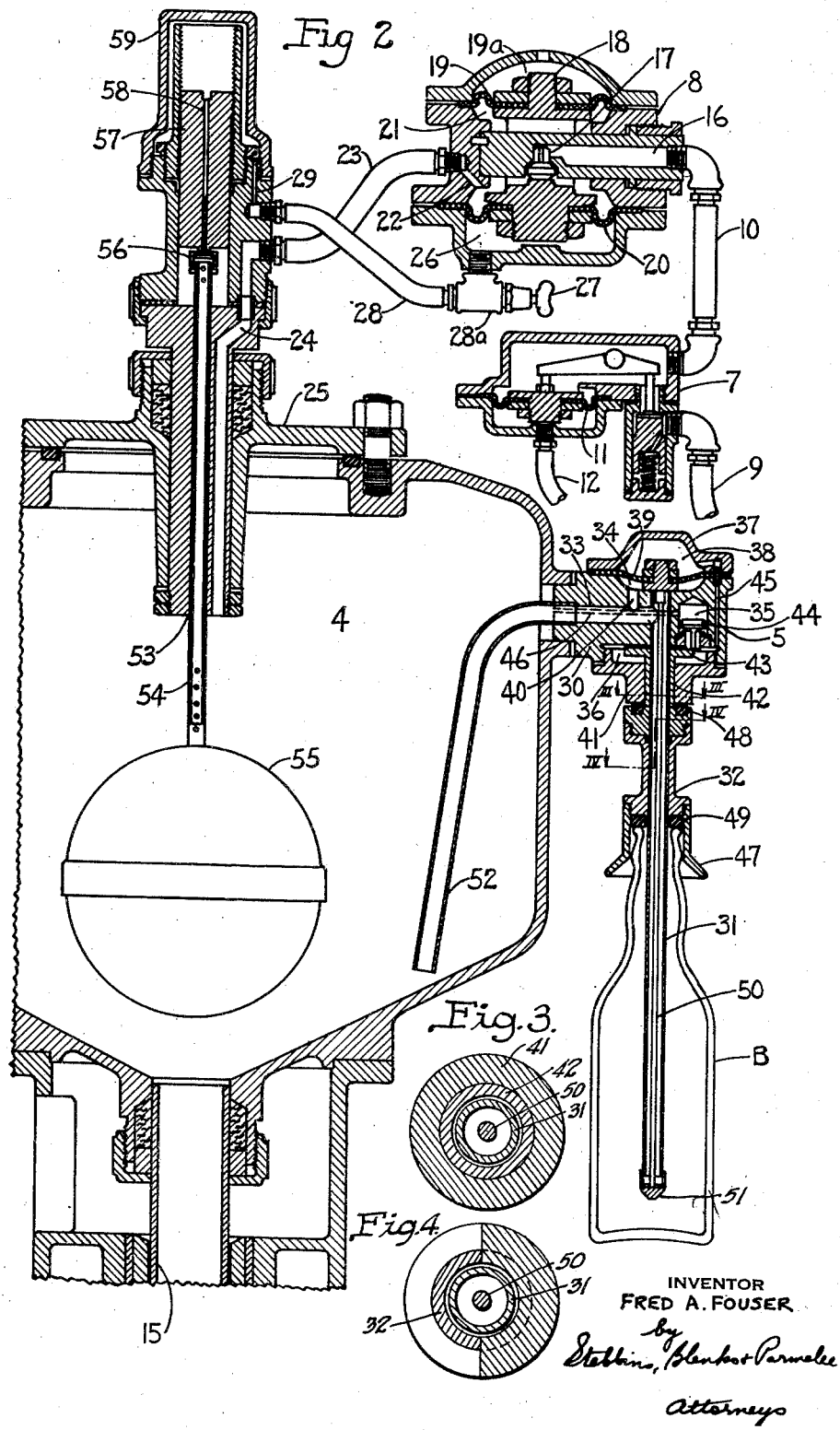
INVENTOR
FRED A. FOUSER
by
Stebbins, Blenko + Parmelee
Attorneys Patented Sept. 26, 1939

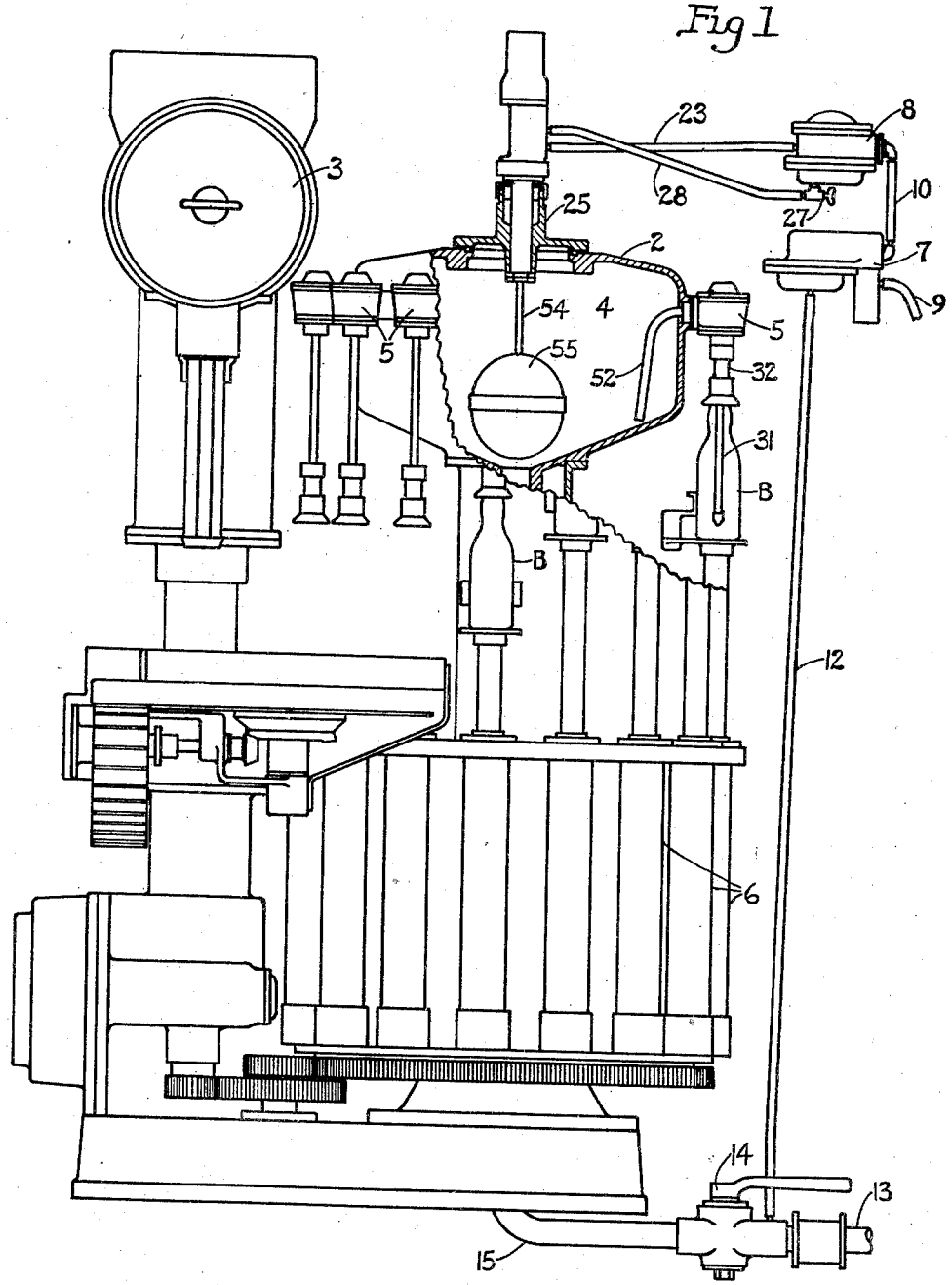

2,174,384

UNITED STATES PATENT OFFICE 2,174,384

APPARATUS FOR FILLING CONTAINERS

Fred A. Fouser, Pittsburgh, Pa., assignor, by mesne assignments, to McKenna Brass and Manufacturing Corporation, Millersburg, Pa., a corporation of Pennsylvania Application October 2, 1936, Serial No. 103,780

6 Claims. (Cl. 226—26)

This invention relates, in general, to container-filling apparatus and is herein particularly described as relating to filling machines for the bottling of liquids under pressure.

In modern filling machines for bottling liquids under pressure, such as is the case where beer and carbonated beverages are bottled, provision is made for supplying an initial pressure, termed "counter-pressure", within the bottle prior to filling with the beverage, and such pressure is maintained throughout the filling operation. Many beverages contain certain gases in solution therein and must be kept under pressure to maintain such solution while being bottled to prevent foaming and deterioration of the beverage. While the invention will be described as applied to the filling of beer bottles, it is to be understood that it is not limited to such, but may be applied to the filling of containers with other liquids.

Under certain conditions encountered in filling beverage bottles, the beverage is supplied under varying pressure. For example, beer is usually stored in tanks of considerable depth and a constant gas pressure of, say 15 to 20 pounds per square inch, is maintained on the beer surface to prevent the gases in solution from coming out of solution. As the beer is supplied to a filling machine from the storage tank, the total pressure on the beer flowing into the filling tank depends on the gas pressure in the storage tank plus the hydrostatic pressure, and therefore, varies with the varying height of the beer in the tank. For satisfactory operation of the filling apparatus, it is necessary that the pressure on the gas above the beer in the filling tank be kept at a pressure corresponding to the total pressure on the beer. Unless the pressure of the beer and the counter-pressure in the filling tank are kept equal, the bottle-filling apparatus will not function properly, foaming will result and the bottles will not be filled to a uniform level. It is necessary that the empty bottle, just before filling, be put under a pressure corresponding to the beer in the filling tank, and it is customary to provide this pressure from the gas above the beer in the filling tank. As the beer flows into the bottle, the gas under pressure in the bottle must be discharged therefrom and it is advisable for the sake of economy that it be discharged back into the filling tank. Foaming tends to interfere with the discharge of the gases from the bottle and to cause uneven filling.

For filling to a uniform height, it is essential that the level of the beer in the filling tank be maintained substantially constant. Heretofore, difficulty has been experienced in keeping this level constant and elaborate apparatus has been employed therefor, which was not entirely suitable due to the constantly varying beer pressure.

By the use of apparatus embodying my invention, it is possible to maintain the counter-pressure in the filling tank at the same pressure as the total pressure on the entering beer and to keep the level of the beer in the container at a very closely controlled predetermined height. The bottles can be uniformly filled to an exact height and foaming of the beer introduced into the bottle is entirely obviated.

In the accompanying drawings, illustrating the present preferred embodiment of my invention as applied to beer bottle-filling apparatus and in which like reference characters refer to corresponding parts in the several forms:

Figure 1 is a view partly in elevation and partly in section of a filling and bottling machine embodying my invention, certain parts being arbitrarily located for purposes of illustration;

Figure 2 is a sectional view of the upper right-hand portion of the machine; and Figures 3 and 4 are sectional views along the lines III—III and IV—IV, respectively, of Figure 2, but to an enlarged scale.

In the drawings, 2 designates a filling machine for filling bottles with beer under pressure and 3 is a crowning unit which may be so closely associated with the filling machine as to, in fact, constitute a single apparatus, or the filling machine and the crowning unit may be widely separated.

The filler 2 consists of a tank or chamber 4 to the upper sides of which a plurality of filling valves 5 are connected. Associated with each valve is a bottle lift 6, which raises the bottle into filling position in contact with its filling valve at a predetermined point in the operation cycle and then lowers it. The bottle lifts may be actuated in any usual manner, such as by suitable cams or by air pressure mechanism. As the means for operating the lifts are well known in the art and form no part of my invention, such part of the apparatus need not be further described.

For maintaining counter-pressure in the filling tank 4, air under pressure is supplied through and controlled by pressure regulator 7 and the double diaphragm valve 8. The pressure regulator valve 7 is of the type which is the subject matter of United States Patent No. 2,001,209, issued May 14, 1935, to Evan L. Moberg. This valve serves to control the pressure of the air passing therethrough, which air is supplied under variable pressure, which may be from 25 to 60 pounds or more or less per square inch, through connection 9. The pressure of the air which is supplied from valve 7 to double diaphragm valve 8 through pipe 10 is equal to the total pressure on the beer, since diaphragm 11 of valve 7 is connected by means of pipe 12 to the beer supply pipe 13. Beer from pipe 13 passes through valve 14 and pipe 15 into the bottom of the filling tank 4. The valve 7, the operation of which is fully set forth in said United States Patent No. 2,001,209, controls the varying air pressure supplied through connection 9 so that the pressure entering the double diaphragm valve 8 through pipe 10 very closely approximates the pressure of the entering beer supply which is exerted against diaphragm 11 through pipe 12.

The double diaphragm valve 8 consists of an air passage 16, the inner end of which forms a valve seat for valve 17, which is operated by movement of yoke member 18, the upper part of which is connected to diaphragm 19 and the lower end of which is connected to diaphragm 20, the diaphragm 20 being larger in area than diaphragm 19. Between diaphragms 19 and 20 is an annular space 21, which is connected by means of port 22 through pipe 23 to passage 24, which leads through the filling tank head or cover 25 to the filling tank 4. The space 26 below the diaphragm 20 is connected through T 28a and pipe 28 to passage 29 in the cover 25. The T 28a has associated therewith a needle valve 27 for maintaining a connection or leak to the atmosphere. The space 19a above diaphragm 19 is open to the atmosphere.

The filling valve 5 consists of a body member 30, a filling tube 31, secured thereto, and a sleeve member 32 slidably mounted on tube 31. The body member 30 has a passage 33 therein connecting to the interior of the tube 31, and recesses 34, 35 and 36. Recess 34 has associated with it an outwardly dished head 37 with a recess 38 therein. Between the dished head 37 and the body member 30, a flexible diaphragm 39 is secured. This diaphragm separates recesses 34 and 38. Recess 34 is connected to passage 33 by the opening 40. Recess 36 is closed by a cap member 41 having therein a passage 42 in which is received a T-shaped valve lifter 43, which is slidably mounted on tube 31. The upper part of the lifter is received in recess 36 and the other end of the lifter extends along tube 31 and projects slightly beyond the end of member 41. Recess 36 communicates with recess 35 through a passage controlled by valve 44 and with recess 38 by means of the passage 45. Valve 44 is so arranged that it can be operated by the movement of valve lifter 43. A passage 46 extends from recess 35 through the body member 30.

Slidably mounted on tube 31 is a sleeve 32, the lower end of which has a bell mouth 47; and sealing gaskets 48 and 49 of rubber or other suitable material are so arranged on sleeve 32 that when a raised bottle B is in the filling position in the bell mouth, the sleeve is sealed against the top of the bottle and against the bottom of member 41. The lifter 43 and sleeve 32 are fitted to tube 31 so that air or gas may pass between the tube and lifter 43 and sleeve 32. It will be observed that there is no packing between the filling tube and the other portion of the valve, and this feature does away with a source of trouble and insures trouble-free operation.

In order to prevent foaming when a bottle is being filled, the filling tube 31 must extend close to the bottom of the bottle. To compensate for bottles of different heights, I provide sleeves 32 of varying lengths. The appropriate length of sleeve is readily attached when a change in bottle heights is being made.

Axially positioned within tube 31 is a rod 50, the upper end of the rod being fastened to diaphragm 39 and the lower end to the tube closing valve 51, which closes the lower end of the filling tube 31. The length of this rod is such that when diaphragm 39 is in the position shown in Figure 2, the valve is open and upon suitable movement of the diaphragm, as will hereinafter be described, the rod 50 is lifted, thus closing the discharge end of tube 31 by the seating of valve 51. A syphon 52 extends from passage 33 toward the bottom of the tank to a position where its open end will be always below the desired level of the beer in the tank. The passage 46 also opens into the upper end of the tank when the valve is in position attached to the upper side wall of tank 4.

The tank cover 25 has a passage 24 therethrough which communicates with the double diaphragm valve 8. There is also a passage 53 through the tank cover in which is slidably received a tube 54, to the lower end of which the float 55 is attached and to the upper end of which a valve 56 is secured. Perforations are made in tube 54, the float 55 and adjacent the valve 56. In the upper end of the tank cover and axially disposed with reference to tube 54 is an adjusting member 57 through which an axial passage 58 extends. By adjusting the position of member 57, the operative position of float 55 is adjusted and consequently, the beer level in tank 4. A cap 59 surrounds the upper end of the tank cover so that there is an annular space which connects with passage 58 and with passage 29, which leads to the double diaphragm valve 8.

*Operation*

The air pressure supply is established through connection 9 and pressure regulator valve 7. Inasmuch as valve 7 is also connected by means of pipe 12 to the beer supply, the pressure of the beer is exerted against the diaphragm of valve 7. Air under the same pressure as that of the beer supply is passed through regulator 7, through pipe 10 into the valve 8, through passage 16, valve 17 into the annular space 21, thence through port 22, pipe 23 and passage 24 to the tank 4. A pressure is built up in tank 4, which is less than the pressure of the incoming air, due to the fact that the air can bleed out through the filling valves. The float 55 is adjusted so that when the beer reaches the desired level in the tank, valve 56 will close passage 58. Valve 14 is then opened so that beer under pressure is supplied from pipe 13 through pipe 15 to the tank 4.

When the level of the beer in tank 4 reaches the desired height, float 55 will rise and operate valve 56 to shut off the escape of air through passage 58 and the lower end of syphon tube 52 will be closed by the beer. Beer or air under pressure will flow through tube 52, passage 33, passage 40 and against diaphragm 39, thereby lifting the rod 50 and valve 51 and closing the exit of tube 31. Thereupon, the air pressure built up in tank 4 will be equal to the pressure of the beer and, due to the equilibrium, the beer level will remain stationary at the predetermined level. In order to fill tube 52, passage 33 and filling tube 31 with beer, it may be necessary, before a bottle is placed in filling position, to manually open valve 51, which can be done by pulling down on it so that the beer will flow into and fill tube 31. The valve is then allowed to close itself, which it will do by reason of the pressure of the beer against diaphragm 39.

A bottle to be filled is raised by its lift, the bell mouth centers the bottle and the filling tube 31 enters the bottle. The bottle continues to rise until the top of sleeve 32 contacts and seals against member 41. The bottle is sealed by contact with sealing member 49. During the last approximately one-sixteenth inch of the upward movement of the bottle, the valve lifter 43 is raised which, in turn, raises valve 44 and permits air under pressure from tank 4 to enter the bottle through passage 46, recess 35, recess 36 and the space between the outside of the tube 31, the sleeve 32 and lifter 43. The pressure also passes through port 45 to recess 38, where it acts on the top of the diaphragm 39. When the pressure of the air on top of this diaphragm equals the pressure of the beer underneath the diaphragm, the diaphragm will drop and with it rod 50 and valve 51, thus permitting the beer to flow into the bottle. As the beer flows into the bottle, air from the bottle passes back to the tank through the same passages through which it entered. The bottle continues to fill by syphon action until the level of the beer in the bottle is the same as that of the beer in the tank 4.

After the bottle is filled, it is lowered by appropriate mechanism. As the bottle is slightly lowered, valve 44 closes, thus cutting off communication between the bottle and tank 4, contact between sleeve 32 and member 41 is broken and the air pressure in recess 38 and in the upper part of the port is dissipated and the diaphragm 39 is forced upward by the pressure of beer exerted against its under side, and valve 51 is closed.

As each bottle is filled, beer is taken from the tank and air is added thereto as it is forced from the bottle, and as a result, the float 55 will lower and open the valve 56 at top of the float rod 54. This permits air to pass through tube 54, passage 53, port 29, pipe 28, to the under side of diaphragm 20 in valve 8 and through the slightly open needle valve 27 to the atmosphere. This pressure acts against the under side of the lower diaphragm 20, forces yoke member 18 upward, thus closing air inlet valve 17, and the supply of air from the air pressure supply is shut off. The bleeding of air through valve 27 will lower the air pressure in tank 4 and beer will flow in until the float is raised and valve 56 closed. The pressure then bleeds from under the lower diaphragm 20 of regulator valve 8 and since the lower diaphragm 20 has a greater area than the upper diaphragm 19, the connecting yoke 18 is forced down and the air valve 17 opened. Air will pass to the tank and equalize the beer pressure. Thereafter, the process is repeated.

By the use of this apparatus, the beer level can be maintained at a desired height within very close limits, and there is no foaming of the beer in the bottle or in the passages and each bottle is filled to a uniform height. Furthermore, it is possible to adjust the flow height and consequently the height to which the bottle will be filled without disturbing the operation of the machine. Due to the establishment of counter-pressure in the filling tank immediately prior to the first filling of the tank, it is possible to obviate foaming and insure quiet filling of the first tank full of beer which is bottled. The mechanism is entirely automatic in operation and once adjusted, will operate indefinitely so long as air pressure supply and beer supply are maintained even though the pressure of each may vary. Complicated control mechanism is avoided and by means of this comparatively simple apparatus, a greater output of properly filled bottles is obtained.

While I have illustrated and described the present preferred embodiment of my invention, as applied to apparatus for filling beer bottles, it will be understood that it is by way of example only and that the invention may be otherwise embodied or practiced within the scope of the following claims.

I claim:

1. In a machine for filling containers with a liquid under pressure, a filling tank into which the liquid is passed, means adjustable from the outside of the machine for regulating the height of the liquid in the tank, means for supplying gas to the tank at a pressure which is directly responsive to the liquid pressure, and means connected to the tank having passages for the flow of gas and liquid to and from the tank said last mentioned means including a siphon operable by contact with the container to be filled for siphoning the liquid from the tank into the containers and for controlling the flow of gas between the tank and the container.

2. In a machine for filling containers with a liquid under pressure, a filling tank into which the liquid is passed under varying pressures, means adjustable from the outside of the machine for regulating the height of the liquid in the tank, means for admitting gas under pressure to the tank, means for maintaining the volume of the gas in the tank substantially constant and at a pressure which is directly responsive to the liquid pressure, a filling head for filling the containers with liquid from the tank, said head being operable by movement of the containers into and out of the filling position and means connecting the tank and head into which the liquid can be siphoned from the tank into the container.

3. In a machine for filling containers with a liquid under pressure, a filling tank into which the liquid is passed under varying pressures, means operated by the height of the liquid in the tank for controlling the supply of liquid to the tank and the supply of counter-pressure gas to the tank, means for varying the counter-pressure as the pressure of the liquid varies, said means being so adapted that the volume of liquid and the volume of gas in the tank remain substantially constant, means adjustable from outside of the machine for increasing or decreasing the relative volumes of liquid and gas in the tank and means operable by movement of the containers into and out of filling position for first admitting gas from the filling tank into the container and then siphoning the liquid from the filling tank to the container until the level of the liquid in the container is at the same level as the level of the liquid in the tank and allowing the counter-pressure gas to return to the filling tank.

4. In a machine for filling containers with a liquid under pressure, a filling tank into which the liquid is passed under varying pressures, means adjustable from the outside of the machine for regulating the height of liquid in the tank, means for regulating a supply of gas to the tank at a pressure which is directly responsive to the liquid pressure, a filling head, a siphon connecting the tank and head, said filling head comprising a container-filling tube, a diaphragm in the top of the filling head, a valve at the bottom of the tube movable by said diaphragm for controlling the flow of liquid through the siphon, the bottom of the diaphragm being connected to the siphon, a sleeve movable along the tube for sealing the container and movable by the container, and means operated by the sleeve for controlling the flow of gas to and from the container and the filling tank and to the top of the diaphragm.

5. In combination, a pressure filling tank containing gas and liquid under pressure, a filling head connected thereto comprising a filling tube, a siphon tube extending from the filling tube and into the tank, a tube closing valve adjacent the discharge end of the filler tube, means connected to the valve member and operable by the liquid for closing the valve, a sleeve surrounding the filling tube and movable therealong, said sleeve being movable by contact with the container to be filled, and a filler sleeve operable by movement of the sleeve for controlling movement of the gas to and from the tank and the container to be filled and for controlling the opening of the tube closing valve.

6. A filling head for filling containers from a chamber containing liquid and gas under pressure comprising a filling tube, a tube closing valve for closing the end of the filling tube, a siphon tube connected to the filling tube, a sleeve surrounding the filling tube and movable therealong by contact with the container to be filled, a flexible diaphragm connected to the tube closing valve and means connected to the siphon tube for exerting liquid pressure against one side of the diaphragm to cause the tube closing valve to close the end of the filling tube, a gas passage, a filler valve operable by movement of the sleeve for controlling the movement of gas through said passage and to the container and means connecting the other side of the flexible diaphragm to the gas passage, said means being controlled by operation of the filler valve.

FRED A. FOUSER.